US008990361B2

(12) United States Patent
Krapf et al.

(10) Patent No.: US 8,990,361 B2
(45) Date of Patent: Mar. 24, 2015

(54) METHOD AND SYSTEM FOR PROXIMITY-BASED, PEER-INITIATED DEVICE CONFIGURATION

(75) Inventors: Hugo Krapf, Mississauga (CA); Kevin Beatty, Elmira (CA)

(73) Assignee: Psion Inc., Mississauga, Ontario (CA)

( * ) Notice: Subject to any disclaimer, the term of this patent is extended or adjusted under 35 U.S.C. 154(b) by 441 days.

(21) Appl. No.: 12/765,977

(22) Filed: Apr. 23, 2010

(65) Prior Publication Data
US 2011/0264772 A1 Oct. 27, 2011

(51) Int. Cl.
*G06F 15/177* (2006.01)
*G06F 9/445* (2006.01)
*H04L 29/08* (2006.01)
*H04L 12/24* (2006.01)

(52) U.S. Cl.
CPC .............. *G06F 8/61* (2013.01); *H04L 67/104* (2013.01); *H04L 41/082* (2013.01)
USPC ....................................................... 709/220

(58) Field of Classification Search
CPC ........... H04L 67/104; G06F 8/61; G06F 8/60; G06F 8/65
USPC .................................................. 709/220, 228
See application file for complete search history.

(56) References Cited

U.S. PATENT DOCUMENTS

| | | | |
|---|---|---|---|
| 6,389,464 B1 * | 5/2002 | Krishnamurthy et al. ..... | 709/220 |
| 7,013,331 B2 * | 3/2006 | Das ............................... | 709/220 |
| 7,020,706 B2 * | 3/2006 | Cates et al. ................... | 709/229 |
| 7,039,688 B2 * | 5/2006 | Matsuda et al. .............. | 709/220 |
| 7,159,016 B2 * | 1/2007 | Baker ........................... | 709/220 |
| 7,240,106 B2 * | 7/2007 | Cochran et al. ............... | 709/222 |
| 7,378,966 B2 * | 5/2008 | Agarwal et al. ............. | 340/572.1 |
| 7,421,484 B2 * | 9/2008 | Das ............................... | 709/220 |
| 7,546,147 B2 * | 6/2009 | Jitsuishi et al. .............. | 455/566 |
| 7,673,325 B2 * | 3/2010 | Vincent et al. .................... | 726/3 |

(Continued)

FOREIGN PATENT DOCUMENTS

| | | |
|---|---|---|
| CA | 2345526 A1 | 2/2001 |
| CA | 2464787 A1 | 12/2004 |

OTHER PUBLICATIONS

Corresponding PCT Application No. PCT/CA2011/000433 Search Report dated Aug. 26, 2011.

(Continued)

*Primary Examiner* — Backhean Tiv

(57) ABSTRACT

A method and a system for configuring of a client device using a configuration device in a peer to peer communication local network including a plurality of client devices, the configuration device including configuration information designated as sharable information. The method comprises generating a discovery request at the configuration device, the discovery request targeted to the plurality of handheld devices, in response to the discovery request, generating a request for communication with the configuration device from at least one client device, establishing communication between the configuration device and the client device, assigning, at the configuration device, a group to the at least one client device, identifying, at the configuration device, a selection of components from among the sharable information, the selection of components associated with the assigned group and for downloading to the at least one client device; and downloading, for installation at the client device, the selection of components to the at least one client device of the assigned group.

15 Claims, 5 Drawing Sheets

(56) References Cited

U.S. PATENT DOCUMENTS

| | | | |
|---|---|---|---|
| 7,676,802 B2* | 3/2010 | Mittal | 717/168 |
| 7,698,389 B2* | 4/2010 | Sesek et al. | 709/220 |
| 7,765,283 B2* | 7/2010 | Noy et al. | 709/220 |
| 8,880,664 B1* | 11/2014 | Tekle et al. | 709/223 |
| 2002/0049693 A1* | 4/2002 | Gase | 707/1 |
| 2004/0006586 A1* | 1/2004 | Melchione et al. | 709/201 |
| 2004/0019889 A1 | 1/2004 | Melchione et al. | |
| 2004/0181575 A1* | 9/2004 | Mallberg et al. | 709/203 |
| 2004/0201626 A1* | 10/2004 | Lavoie et al. | 345/753 |
| 2004/0267876 A1* | 12/2004 | Kakivaya et al. | 709/200 |
| 2007/0094323 A1* | 4/2007 | Smith | 709/202 |
| 2007/0208837 A1* | 9/2007 | Tian et al. | 709/223 |
| 2007/0233840 A1* | 10/2007 | Alstrup et al. | 709/223 |
| 2008/0222236 A1* | 9/2008 | Nason et al. | 709/201 |
| 2009/0228868 A1* | 9/2009 | Drukman et al. | 717/121 |
| 2009/0319640 A1* | 12/2009 | Kugel | 709/220 |
| 2010/0100582 A1 | 4/2010 | Beatty et al. | |
| 2010/0162374 A1* | 6/2010 | Nair | 726/7 |
| 2010/0164693 A1* | 7/2010 | Zhang et al. | 340/10.31 |
| 2011/0106886 A1* | 5/2011 | Nolterieke et al. | 709/204 |
| 2011/0264772 A1* | 10/2011 | Krapf et al. | 709/220 |
| 2011/0265078 A1* | 10/2011 | Beatty et al. | 717/173 |
| 2012/0233299 A1* | 9/2012 | Attanasio et al. | 709/220 |
| 2012/0278455 A1* | 11/2012 | Peng et al. | 709/220 |

OTHER PUBLICATIONS

Corresponding PCT Application No. PCT/CA2011/000433 Written Opinion dated Aug. 26, 2011.

International Preliminary Report on Patentability and Written Opinion for counterpart International Patent Application No. PCT/CA2011/000433 mailed Nov. 1, 2012.

Extended European Search Report for counterpart EP Application No. 11771434.5 mailed Dec. 13, 2013.

* cited by examiner

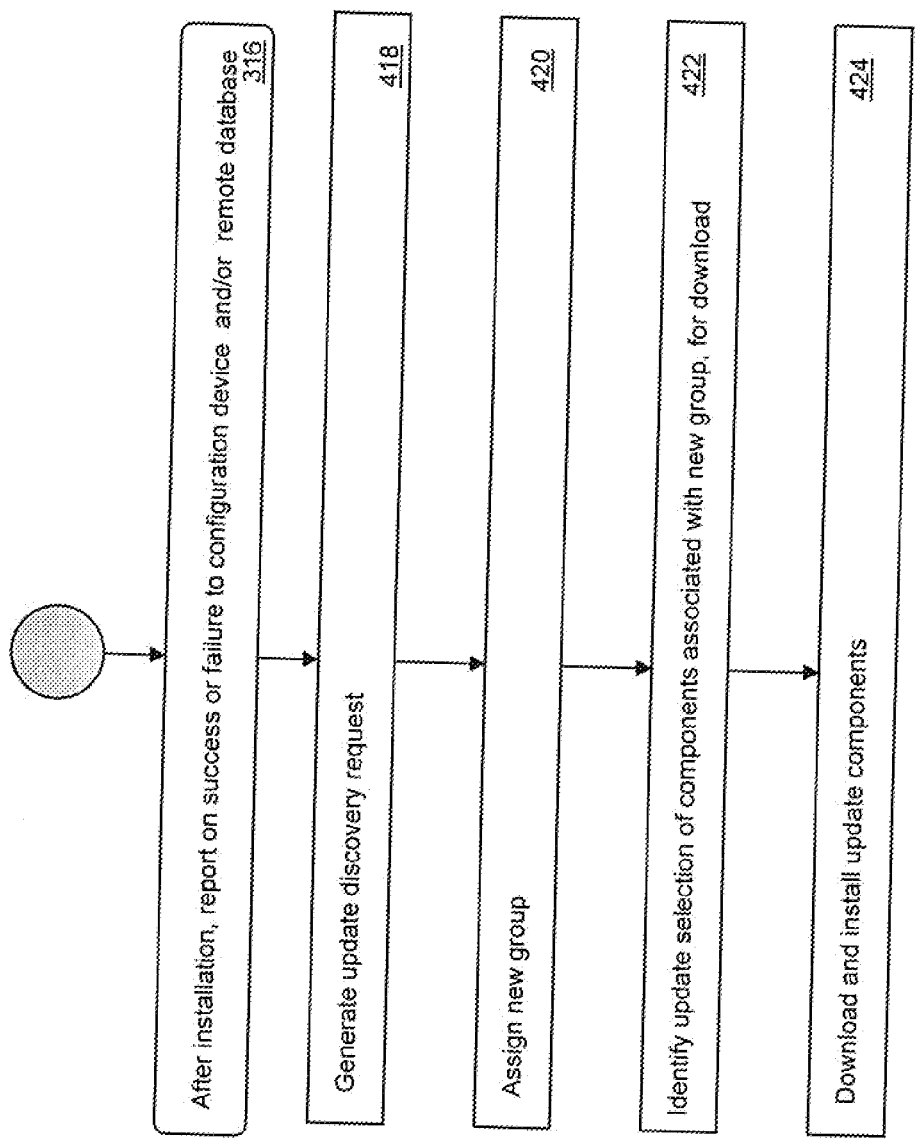

METHOD AND SYSTEM FOR PROXIMITY-BASED, PEER-INITIATED DEVICE CONFIGURATION

FIELD

The present disclosure relates generally to a method and system for configuring a handheld computing device using a proximity-based, peer-initiated approach.

BACKGROUND

Handheld mobile computing devices have proliferated as their usefulness and functionality have improved.

Handheld computers are available in many variations of user functionality. For example, including barcode laser scanning, digital photo and document scanning, Global Positioning System (GPS), MPEG audio layer 3 (MP3) players, user input means (such as keyboard versus touch screen input) and wireless radio frequency-based (RF) communications functionality. Ruggedized versions of handheld devices are widely deployed in industrial use, incorporating varying combinations of the above functionalities.

Device functionality needs of such an industrial customer or user typically evolve and change subsequent to the initial deployment of a given device or a base of devices. To the extent that an existing base of already-deployed devices may be reconfigured to provide updated, better or more specialized functionality, while in the field of operations, and without disruption of deployment, such as having to be returned to the factory to be reconfigured, the utility of the devices to a user or customer is enhanced.

Relatively commonly, there is a need for provisioning of software components to provide customized device functionality, or improved device functionality, typically within the context of a pre-existing hardware configuration or platform, to be advantageously applied to reconfigure already-deployed devices within their existing operational environments, without necessitating a factory return for upgrading.

SUMMARY OF THE INVENTION

Provided is a method for configuring at least one client device by a configuration device in a peer to peer communication local network including a plurality of client devices, the configuration device including configuration information designated as sharable information. The method comprises generating a discovery request at the configuration device, the discovery request targeted to the plurality of handheld devices; in response to the discovery request, generating a request for communication with the configuration device from at least one client device; establishing communication between the configuration device and the at least one client device; assigning, at the configuration device, a group to the at least one client device; identifying, at the configuration device, a selection of components from among the sharable information, the selection of components associated with the assigned group and for downloading to the at least one client device; and downloading, for installation at the client device, the selection of components to the at least one client device of the assigned group.

In an embodiment, the method may further comprise installing the selection of components at the client device.

Yet further, the method may further comprise reporting to the configuration device the results of installing the selection of components, including successful component installations and failed component installations.

In one embodiment, the assigned group is associated with a predefined ordering of configuration components, and downloading comprises downloading the selection of components according to the predefined order.

Yet further, the method may comprise installing, at the client device, the selection of components according to the predefined order of downloading.

In another embodiment, the method may further comprise displaying, at a graphical user interface (GUI) display of the configuration device, the configuration of components in the predefined order for downloading, and modifying the predefined order prior to downloading.

In yet another embodiment, the selection of components downloaded include a software component.

In a further variant, the software component downloaded include a software component file selected from the group of software components consisting of: a software driver, a software application, a portion of a software application, an application program interface, an operating system version and an operating system identifier.

In another embodiment, the step of establishing communications between the configuration device and the client device further comprises communicating an informational element for unique identification of the client device, the informational element selected from the group of informational elements consisting of: a serial number, an operating system, a device model number, IP addresses, and a terminal name.

In one embodiment, the discovered client device is assigned to at least one group based on its pre-existing hardware and/or firmware configuration.

Also provided is a configuration device comprising a discovery module for generating and communicating a discovery request to a plurality of client devices in a peer to peer local communication network; a configuration module including configuration information designated as sharable information, the configuration module for: assigning a group to the at least one client device; identifying a selection of components from the sharable information for download to the at least one client device, the selection of components associated with the assigned group; and downloading the selection of components to the at least one client device of the assigned group.

In one embodiment, assigning a group comprises assigning a group based on pre-existing hardware and/or firmware configuration of the at least one client device.

In another embodiment, the configuration device further comprises a graphical user interface display screen for displaying the identified selection of components.

Also provided is a client device in a peer to peer communication local network, the network including a plurality of client devices and a configuration device. The client device comprises a processor; a memory; a device discovery module for detecting a discovery request initiated at the configuration device and for establishing further communication with the configuration device; a device download module for receiving a downloaded selection of components from the configuration device; and a device installation module for installing, in the memory of the client device, the downloaded selection of components from the configuration device.

In one embodiment, the client device further comprises an update detection module for detecting an update request targeted to a group assigned, by the configuration device, to include the client device.

In yet another embodiment, the client device comprises updating the installed selection of components.

In a further embodiment, the device discovery module communicates to the configuration device an informational element for unique identification of the client device, the informational element selected from the group of informational elements consisting of: a serial number, an operating system identifier, a device model number, IP addresses, and a terminal name.

BRIEF DESCRIPTION OF THE DRAWINGS

Embodiments will now be described by way of example only, with reference to the following drawings in which:

FIG. 4 is an illustrative flowchart showing exemplary process steps involved in yet another embodiment for updating an existing configuration of the client handheld device.

DETAILED DESCRIPTION

It would be advantageous to provide for reconfiguration and upgrading of a base of handheld computers, in the local environment within which they are deployed, without a need disrupting their deployment and usage, such as by returning the units to the factory or distributor. It is apparent that depending on the particular functionality needed, and based on the pre-existing hardware configuration, appropriate software/firmware configurations, including appropriate software drivers, software applications, portions of a software application, application program interfaces, parameter settings, or even an operating system versions or an identifier thereof, may be applied to reconfigure and further customize the base of handheld computers.

Figure 1:
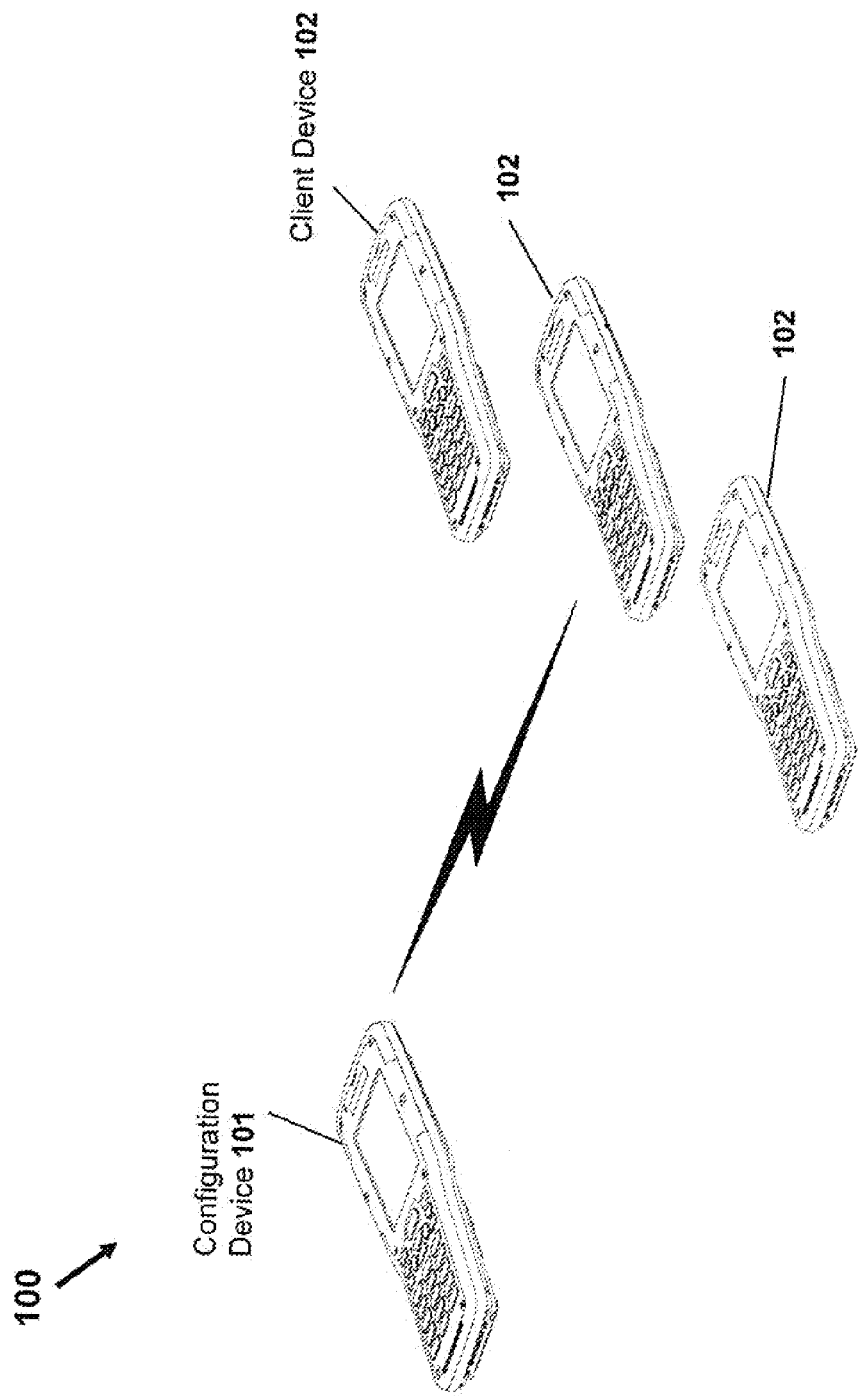
FIG. 1 illustrates an exemplary peer network communication system in accordance with an embodiment where at least one configuration device discovers and manages reconfiguration of a plurality of client handheld computers.

Referring now more particularly to the accompanying figures, FIG. 1 depicts an exemplary peer to peer network communication system in accordance with an embodiment where at least one master, or configuration, device discovers and manages configuration of a plurality of client handheld devices within a given locality. The network system 100 of FIG. 1, which may be a wireless network, forms a closed local network where at least one handheld device, such as configuration device 101, remotely discovers and manages a plurality of handheld computer devices 102. Configuration device 101 may communicate with the plurality of handheld devices 102 using various communication schemes, including, but not limited to, wireless connections via a secure or non-secure Bluetooth™, Wi-Fi WLAN based on IEEE 802.11 standards, Zigbee, Z-Wave and the like. Handheld computers 101, 102 will be referred to variously and interchangeably as a handheld computing device, a handheld device, a mobile computer, or a computing device in the disclosure herein.

Figure 2A:
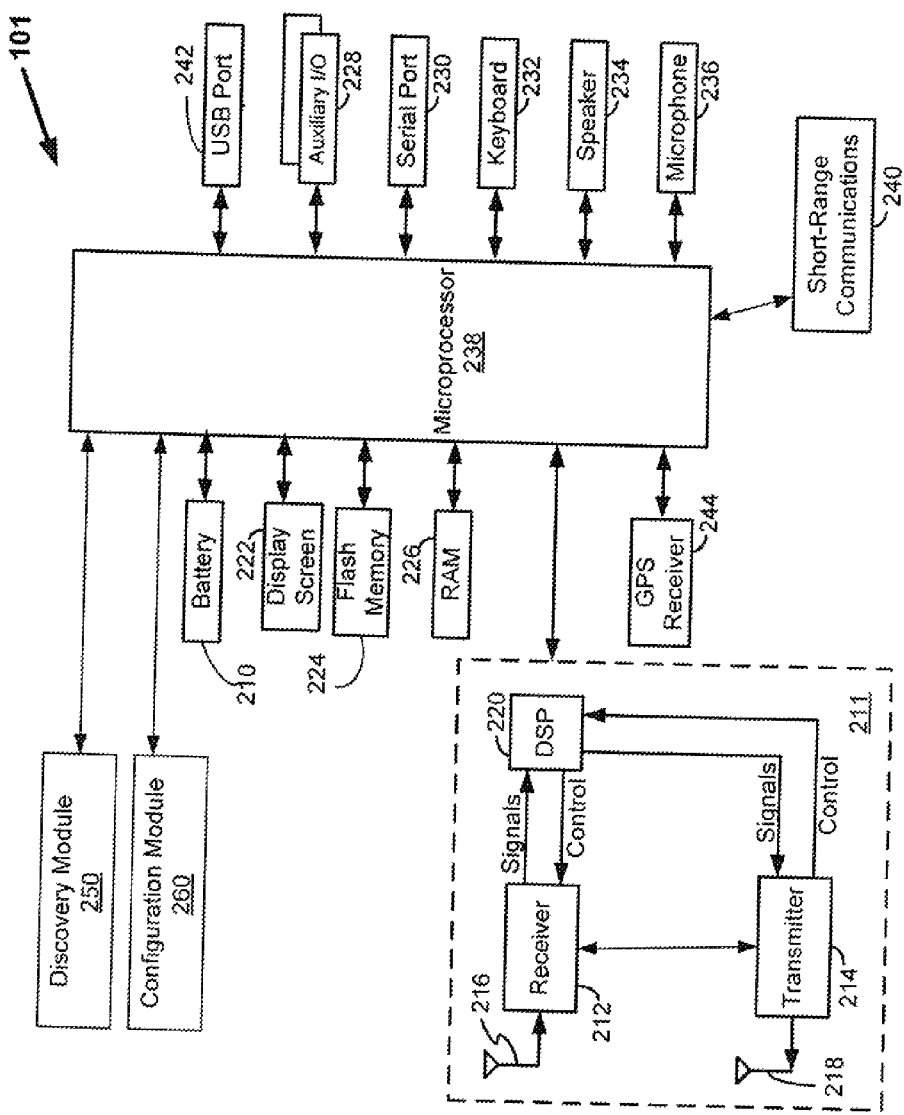
FIG. 2a is a conceptual diagram illustrating the functional subsystems of the configuration device including a device discovery module and a device configuration module.

FIG. 2a illustrates an exemplary architecture of the functional subsystems of configuration device computer 101. The handheld computer 101 may have the capability of communicating at least data, and possibly both data and audio, to and from devices as well as data acquisition sources within a communication network.

Handheld computer 101 may include wired or wireless communication capability. In the wireless configuration, handheld computer 102 typically includes radio frequency (RF) communication subsystem 211, which includes a receiver 212, a transmitter 214, and associated components, such as one or more embedded or internal antenna elements 216 and 218, and a processing module such as a digital signal processor (DSP) 220. As will be apparent to those skilled in field of communications, the particular design of the RF communication subsystem 211 depends on the specific communication network in which handheld device 101 is intended to operate, but may include communication functionalities such as radio-frequency identification (RFID), Wi-Fi WLAN based on IEEE 802.11 standards, Zigbee, Z-Wave and the like.

The handheld device 101 includes a microprocessor 238 which controls general operation of the device 101. The microprocessor 238 also interacts with functional device subsystems such as screen display module 222, a flash memory 224, random access memory (RAM) 226, auxiliary input/output (I/O) subsystems 228, serial port 230, keyboard module 232, speaker 234, microphone 236, short-range communications subsystem 240 such as Bluetooth™ for example, and Universal Serial Bus (USB) expansion port 242 for peripheral. The handheld device 101 may include a power source such as battery module 210 which may also be removable and replaceable from the handheld device. The handheld device 101 may also include a positioning device 244, such as a GPS receiver for example, for receiving positioning information.

Still with regard to FIG. 2a, operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the handheld device 101. A predetermined set of applications, which control basic device operations, or even more customized, advanced device operations, may be installed on the configuration device 101 during its manufacture, such as during the components configuration process described herein. These operations typically include data and voice communication applications, for example.

Display screen module 222 of handheld device 101 may be used to visually present an application's graphical user interface (GUI) to the user via a display screen. The display screen module 222 may employ a touch screen display, in which case the user can manipulate application data by modifying information on the GUI using direct touches by finger. Depending on the type of handheld device 101, the user may have access to other types of input devices, such as, for example, a scroll wheel, trackball, light pen or touch sensitive screen.

A graphical user interface presented at display screen module 222 of configuration device 101 may enable an operator or administrator to interact therewith. For example, an administrator may manage the processes of having configuration device 101 being capable of identification as a configuration device using a parameter setting, initiating discovery, establishing communication with client devices in the peer to peer network, managing groups (including assigning groups, modifying groups, and deleting groups), and the selecting the configuration of components and data to be downloaded from configuration device 101 to one of more of client devices 102.

It further contemplated that configuration device 101 may be communicatively coupled to a remotely located database (not shown).

Discovery module 250 of configuration device 101 may comprise any combination of software, firmware and hardware for implementing a discovery mechanism for discovering new handheld devices within the network and providing an initial deployment to any newly discovered handheld devices. It is further contemplated that discovery module 250 may be used to provide an update mechanism for updating the discovered client devices 102. The discovery requests may be multi-cast or broadcasted, or any variation thereof; it is contemplated that the specific implementation of IP addressing for discovery may be made taking into account the network management considerations, such as security and bandwidth concerns, of the network administrator or the relevant network administration policy. A discovery request may be sent out periodically until terminated at configuration device 101.

An update discovery request initiated at discovery module 250 may be sent out periodically until terminated at the configuration device 101, or until all the targeted (that is, targeted via an assigned group) client devices take an action in response to the discovery request. Configuration device 101 may be capable of identifying itself to other client devices 102 via a parameter setting, prior to sending out the discovery request.

Configuration module 260 of configuration device 101 may comprise any combination of software, firmware and hardware for storing various configuration files, or software components, and other related configuration information. However, it is also contemplated that the configuration files, software components and other related configuration information may be stored in specific memory 224, 226 locations of configuration device 101. The configuration files, software components and other related configuration or provisioning information, whether stored in configuration module 260 or other memory 224, 226 locations, may be specially designated and earmarked as sharable information within configurable client device 101, thus distinguishing them from other non-sharable information of configuration device 101. Other methods of ensuring that the sharable information of configuration device 101 is specially earmarked, and/or segregated, for sharing and made accessible for sharing via the provisioning of components from among the sharable information, for download to client devices 102, will be apparent to practitioners of skill in the art.

The configuration files or software components to be provisioned in order to configure or reconfigure client devices 102 may include appropriate software drivers, software applications, application program interfaces, parameter settings, or even operating systems, including unique identifiers to identify an operating system or any versions thereof. Other configuration information provided in configuration module 260 may include, for example, configuration information related to the various groups to be assigned and managed by the configuration device 101, and components and data for respective configurations of client devices 102, including for configuration updates.

The remote database communicative coupled to configuration device 101 may be accessed, and used to update configuration device 101 via the GUI of configuration device 101, further employing a suitable web service interface, optionally. It would be appreciated by one of ordinary skill in the art that the configuration device 101 may contain additional functions/elements/mechanisms other than those illustrated in FIG. 2a.

Figure 2B:
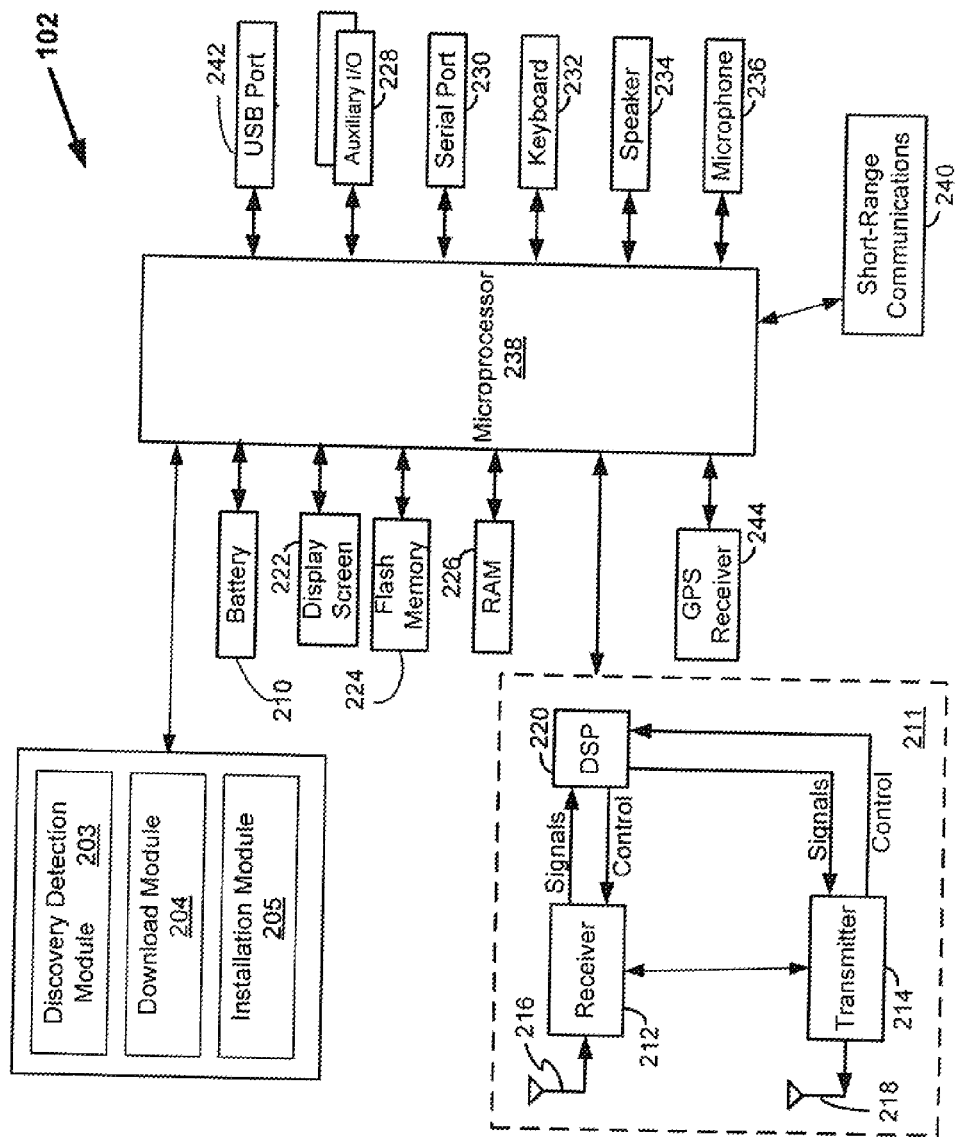
FIG. 2b shows an exemplary perspective view of the client handheld computer.

With reference now to FIG. 2b, an exemplary architecture of the functional subsystems of client device 102 within peer to peer communication network 100 is depicted. While significant commonality exists in functionality as described above with regard to configuration device 101, at least to the extent where configuration device 101 and client device 102 are considered peer devices operating in a local peer to peer communication network 100, some differences will be apparent in view of the following description, with regard to the embodiments depicted in FIG. 3.

Device discovery module 203 of client device 102 may comprise any combination of software, firmware and hardware for detecting a discovery request initiated at the configuration device 101 and for establishing further communication therewith.

Download module 204 of client device 102 may comprise any combination of software, firmware and hardware to accept downloads of selected components transmitted from configuration device 101, the components related to a respective configuration of client device 102. Download module 204 of the client device 102 may detect when the downloading of configuration components is finished, and may then launch installation module 205 for installing the components downloaded in a memory of client device 102.

Installation module 205 of client device 102 may comprise any combination of software, firmware and hardware for doing the actual installation of the components, and for reporting the progress of the installation to configuration device 101. This may involve copying files, launching a setup function to execute installation scripts, and performing other post-installation actions. The installation module 205 may process downloaded configuration components and may report success or failure on a component by component basis. When installation is completed, it may transfer the details of the installation log file for a particular handheld device back to the configuration device 101. Configuration device 101 in turn may then update a registry component at the remote database which tracks and stores such configuration information.

Figure 3:
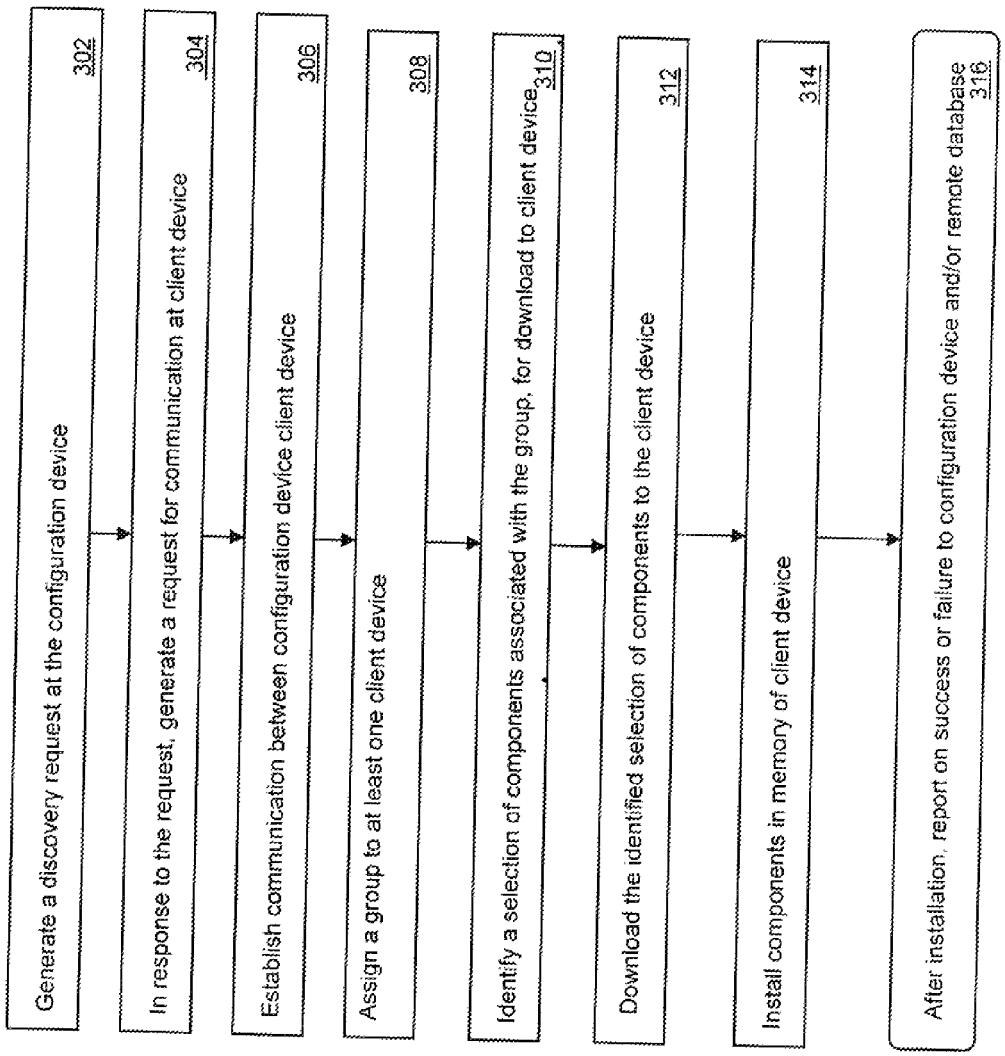
FIG. 3 is an illustrative flowchart showing exemplary process steps involved in one embodiment for configuring or reconfiguring the client handheld device.

FIG. 3 illustrates exemplary process steps involved in one embodiment for configuring or provisioning client devices 102 with appropriate components. It will become evident from the following disclosure that provisioning the appropriate components for client devices 102 refers to the particular selection of components which are associated with a desired custom configuration or functionality, to be downloaded for installation thereon, in order to create a client device 102 of desired functionality.

At step 302, a discovery request is generated at configuration device 101, the discovery requested targeted to any or all of the plurality of handheld devices 102 in local peer to peer network 100.

At step 304, in response to the discovery request, a request for communication with the configuration device 101 is generated from at least one of the client devices 102. When the client devices 102 are discovered initially, they are identified as the "unassigned group" in the configuration device 101. Each discovered client device 102 in the unassigned group is subsequently assigned to one or more groups.

At step 306, communication is established between the configuration device 101 and the at least one client device 102. Client device 102 may, for example, communicate to configuration device 101 an informational element for unique identification of the client device. The informational element may be such as: a serial number, an operating system identifier, a device model number, IP addresses, and a terminal name. Once the client device 102 responds to the discovery request and communicates its information, it may be added into a management list at configuration module 260 of configuration device 101, or in the remote database.

At step 308, at configuration device 101, a group is assigned to the at least one client device 102. In one exemplary embodiment, the discovered client device 102, formerly in the unassigned group, is now assigned to one or more groups based on its pre-existing hardware and/or firmware configuration.

The assignment of client device 102 to a group allows one or more discovered client devices 102 to be targeted for configuring, in accordance with a pre-defined selection of configuration components uniquely associated with that given group. In one example, the group can be used as a functional unit that ties, or associates, a set of components (e.g., configuration files) or data to a set of client devices 102. In this example, a set of components is downloaded to the entire group of client devices 102 simultaneously or nearly simultaneously. Any given configuration component may be associated with zero to any number of groups. The assigned group may also be associated with a predefined ordering of configuration components, for downloading the configuration of components according to the predefined order.

In another variation, it is contemplated that, at the graphical user interface (GUI) display of the configuration device 101, the configuration of components in the predefined order for downloading may be displayed, and then that predefined order may be modified by the operator or administrator.

At step 310, at the configuration device 101, the unique configuration of components for provisioning via download to client device(s) 102 is identified, the configuration of components being associated with the group assigned. Once a given client device 102 is assigned to a respective group(s), configuration device 101 is then able to download the associated configuration components so that the client devices 102 may configured, or reconfigured, on a group basis.

At step 312, the associated configuration of components is downloaded only to those client device(s) 102 belonging to the assigned group. The configuration of components may be downloaded onto the client device 102 via the communication subsystem 211, an auxiliary I/O subsystem 228, serial port 230, USB port 242, short-range communications subsystem 240, or any other suitable subsystem, for execution by the microprocessor 238.

At step 314, the configuration of components downloaded is installed into a memory of the client device(s) 102.

At step 316, the results of the configuration component installations, including successful component installations and failed component installations, may be reported to configuration device 101.

FIG. 4 illustrates a further variation of the exemplary process of FIG. 3, whereby the configuration components of the client device in a group may be updated. For instance, some or all client devices 102 assigned to a given group may be moved to another group by sending a new discovery request, an update request, at step 418, to initiate the process. At step 420, configuration update device 101 may assign the new group desired, and identifies an updated configuration of components at step 422, for download and installation at step 424. It is also contemplated that, for updates, the client devices 102 may comprise an update detection module (not shown) for detecting discovery requests for updates.

Although a mobile or handheld computer has been used to establish a context for disclosure herein, the invention is contemplated as having wider applicability for computing device configuration or reconfiguration in the context of field operations. Furthermore, the disclosure herein has been described with reference to specific exemplary embodiments; however, varying modifications thereof will be apparent to those skilled in the art without departing from the scope of the invention as defined by the appended claims.

What is claimed is:

1. A method for configuring a plurality of handheld client devices, each having an identical hardware configuration, by a handheld configuration device for managing the handheld client devices in a peer to peer communication local network including the plurality of handheld client devices and the handheld configuration device, the method comprising:
   generating a discovery request at the handheld configuration device, the discovery request targeted to the plurality of handheld client devices;
   periodically transmitting the discovery request until each of the plurality of handheld client devices responds to the discovery request;
   generating a request for communication with the handheld configuration device from each of the plurality of handheld client devices in response to the discovery request;
   establishing communication between the handheld configuration device and each of the plurality of handheld client devices;
   assigning a group to each of the plurality of handheld client devices based on at least one of its pre-existing hardware and firmware configuration;
   designating information stored in the handheld configuration device as at least one of sharable information and non-sharable information, wherein the sharable information comprises configuration information for downloading to the plurality of handheld client devices;
   identifying, at the handheld configuration device, a selection of components from among the sharable information, the selection of components associated with the assigned group and for downloading to the plurality of handheld client devices;
   uploading, by the handheld configuration device to each of the plurality of handheld client devices, for installation at each of the plurality of handheld client devices, the selection of components associated with the assigned group; and
   installing the selection of components at each of the plurality of handheld client devices.

2. The method of claim 1 further comprising reporting to the handheld configuration device the results of installing the selection of components, including successful component installations and failed component installations.

3. The method of claim 1 wherein the assigned group is associated with a predefined ordering of configuration components, and downloading comprises downloading the selection of components according to the predefined order.

4. The method of claim 3 further comprising installing, at the handheld client device, the selection of components according to the predefined order of downloading.

5. The method of claim 3, further comprising displaying, at a graphical user interface (GUI) display of the handheld configuration device, the configuration of components in the predefined order for downloading, and modifying the predefined order prior to downloading.

6. The method of claim 1 wherein the selection of components downloaded includes a software component.

7. The method of claim 6 wherein the software component downloaded include a software component file selected from the group of software components consisting of: a software driver, a software application, a portion of a software application, an application program interface, an operating system version, and an operating system identifier.

8. The method of claim 1 wherein the step of establishing communications between the handheld configuration device and each of the plurality of client devices further comprises communicating an informational element for unique identification of the each of the plurality of client devices, the informational element selected from the group of informational elements consisting of: a serial number, an operating system identifier, a device model number, IP addresses, and a terminal name.

9. The method of claim 1, further comprising transmitting, by each of the plurality of handheld client devices, an installation log file to the handheld configuration device when the installation of the selection components is completed, wherein in response to receiving the installation log file the handheld configuration device updates a registry component at a remote database.

10. The method of claim 1, further comprising generating and communicating an update request to at least one of the plurality of handheld client devices to assign a new group and identify an updated selection of components for the at least one of the plurality of handheld client devices.

11. A handheld configuration device comprising:
a discovery module comprising a radio frequency (RF) communication subsystem for generating and communicating a discovery request to a plurality of handheld client devices each having an identical hardware configuration in a peer to peer communication local network that includes the handheld configuration device, the discovery module periodically transmitting the discovery request until each of the plurality of handheld client devices responds to the discovery request; and
a configuration module comprising a microprocessor for:
assigning a group to each of the plurality of handheld client devices based on at least one of its pre-existing hardware and firmware configuration;
designating information stored in the handheld configuration device as at least one of sharable information and non-sharable information, wherein the sharable information comprises configuration information for downloading to the plurality of handheld client devices;
identifying a selection of components from the sharable information for download to each of the plurality of handheld client devices, the selection of components associated with the assigned group; and
uploading the selection of components to each of the plurality of handheld client devices of the assigned group.

12. The handheld configuration device of claim 11 further comprising a graphical user interface display screen for displaying the identified selection of components.

13. The handheld configuration device of claim 11, wherein each of the plurality of handheld client devices comprises an update detection module for detecting an update request targeted to a group assigned by the handheld configuration device.

14. The handheld configuration device of claim 11, wherein each of the plurality of handheld client devices comprises a device discovery module that communicates to the handheld configuration device an informational element for unique identification of each of the plurality of handheld client devices, the informational element selected from the group of informational elements consisting of: a serial number, an operating system identifier, a device model number, IP addresses, and a terminal name.

15. The handheld configuration device of claim 11, wherein each of the plurality of handheld client devices transmit an installation log file to the handheld configuration device when an installation of the selection components is completed, further wherein in response to receiving the installation log file the handheld configuration device updates a registry component at a remote database.

* * * * *